June 21, 1938.  G. H. ZOUCK  2,121,556
LATERAL MOTION DEVICE FOR RAILWAY VEHICLE AXLES
Filed Feb. 9, 1935  3 Sheets-Sheet 1
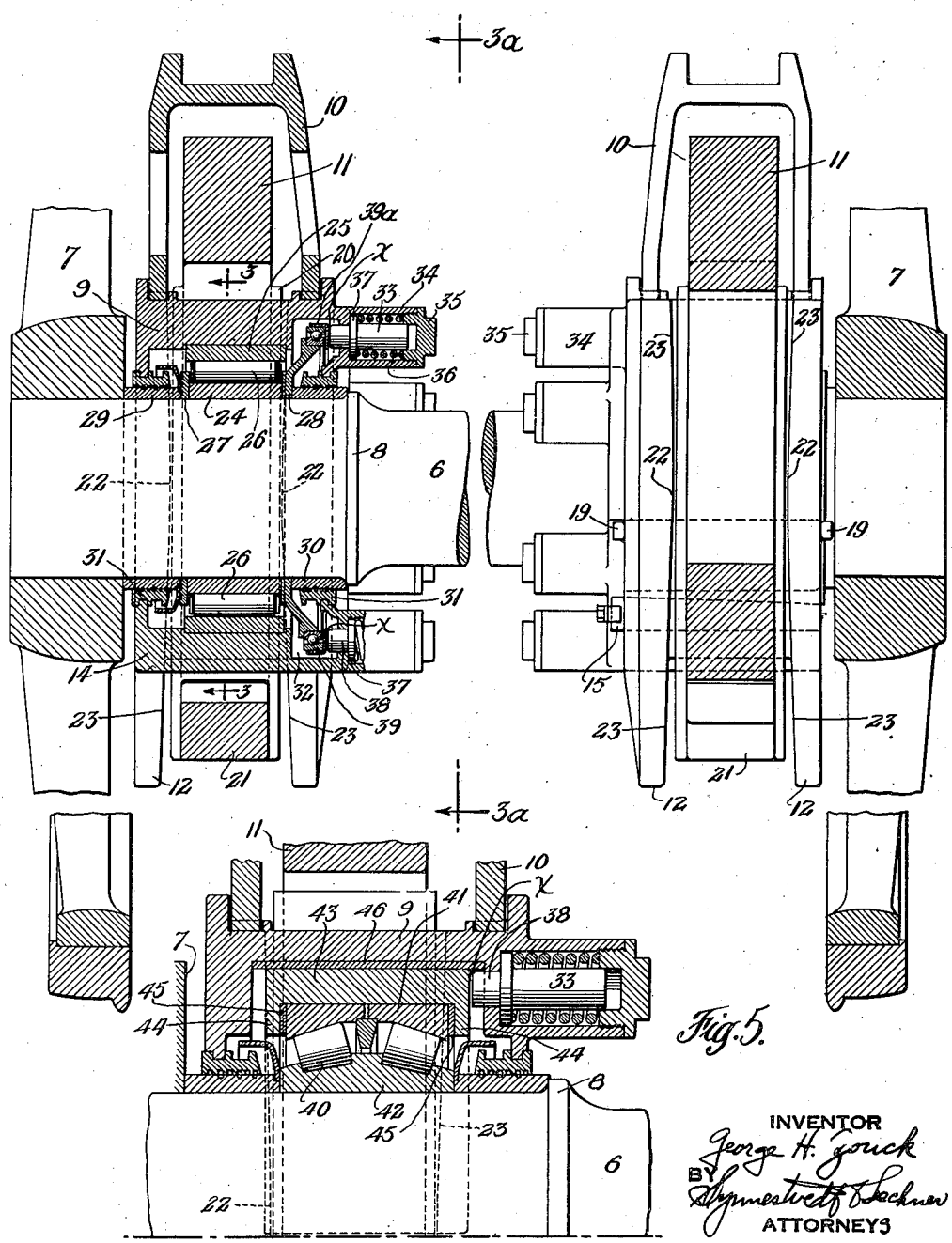

June 21, 1938.   G. H. ZOUCK   2,121,556
LATERAL MOTION DEVICE FOR RAILWAY VEHICLE AXLES
Filed Feb. 9, 1935   3 Sheets-Sheet 2
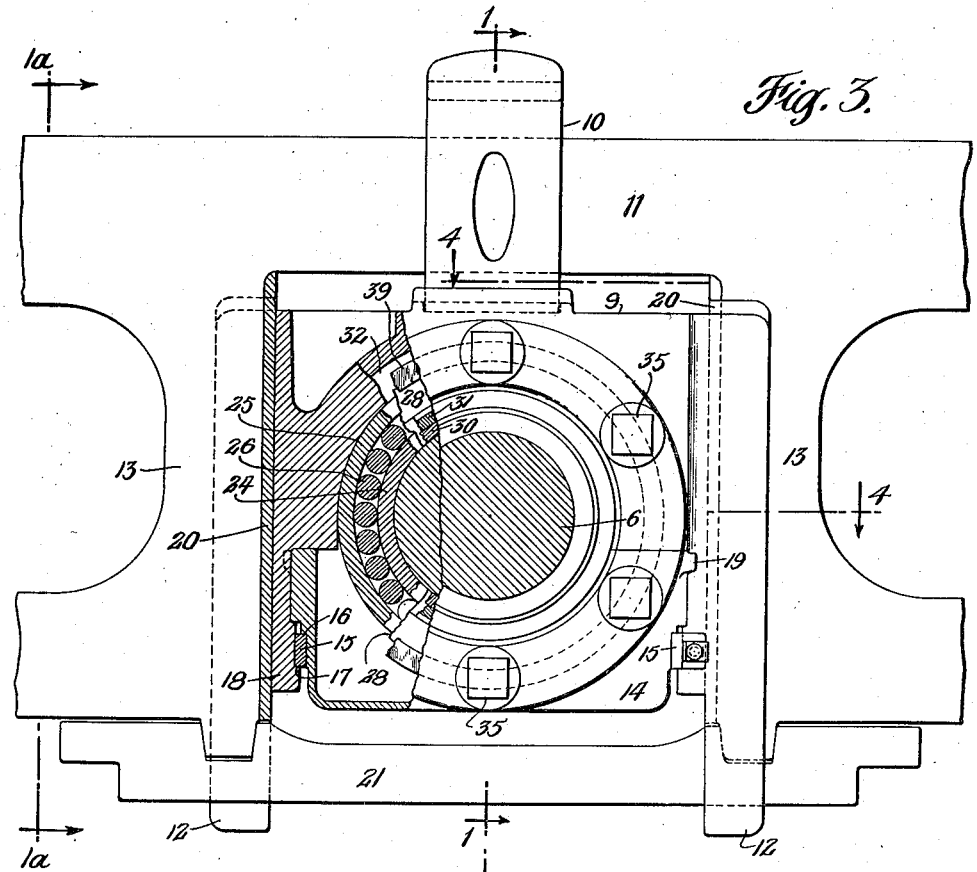
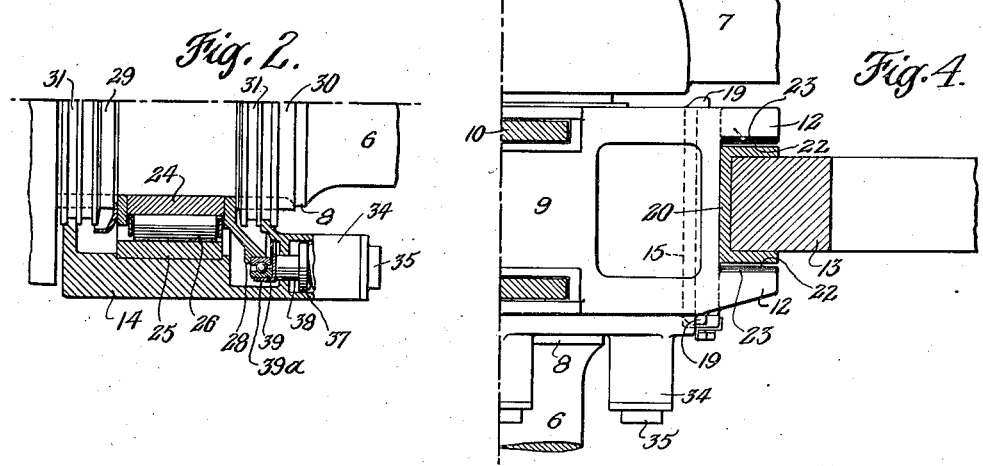
INVENTOR
George H. Zouck
BY
Synnestvedt & Lechner
ATTORNEYS Patented June 21, 1938

2,121,556

UNITED STATES PATENT OFFICE 2,121,556

LATERAL MOTION DEVICE FOR RAILWAY VEHICLE AXLES

George H. Zouck, Orange, N. J., assignor to Franklin Railway Supply Company, New York, N. Y., a corporation of Delaware Application February 9, 1935, Serial No. 5,750

13 Claims. (Cl. 308—180)

This invention relates to equipment for providing a railway vehicle axle with lateral motion and it is particularly concerned with a device of this kind in which such motion, except for a small degree of what is termed "free lateral" movement, is yieldingly resisted and definitely controlled. The invention is especially useful in controlling the lateral motion of axles on railway vehicles which have long rigid wheel bases such, for example, as are found in modern large size, high power locomotives, although it is not to be limited to such use because it is equally applicable to any railway vehicle.

The principal objects of the invention are to provide greatly improved riding qualities for the vehicle and to reduce to a minimum the wear upon wheel flanges, rails, etc., as well as to distribute whatever wear does occur more uniformly throughout the parts adjacent to or associated with each of the several axles of the vehicle.

Another object of the invention is the provision of means whereby anti-friction bearings are employed in a novel way to secure the desired lateral motion of the axle.

The invention is in the nature of an elaboration of the broad ideas disclosed and claimed in my copending application No. 696,693, filed November 4, 1933, to which application reference may be had for a fuller discussion of the principles involved in lateral motion devices.

The foregoing, together with such other objects as may appear hereinafter or are incident to my invention are obtained by means of constructions which are illustrated in preferred forms in the accompanying drawings, wherein—

Figure 1 is a composite, vertical section transversely of a locomotive, the left-hand side of the figure being taken in the plane of a driving axle approximately on the line 1—1 of Figure 3 and the right-hand side of the figure being a section taken approximately as indicated by the line 1a—1a in Figure 3.

Figure 2 is a fragmentary section similar to that which is shown in the left-hand portion of Figure 1 but with the parts in their extreme position of lateral motion.

Figure 3 is a composite cross-sectional view taken transversely of the axle, the left-hand portion of the view being taken approximately on the line 3—3 of Figure 1 and the right-hand portion approximately on the line 3a—3a of Figure 1.

Figure 4 is a fragmentary plan section taken approximately on the line 4—4 of Figure 3 with the driving box appearing in plan view.

Figure 5 is a fragmentary section on a reduced scale similar to that of the left-hand portion of Figure 1, illustrating certain features of the invention as applied in connection with an anti-friction bearing of the tapered roller type.

Figure 6:
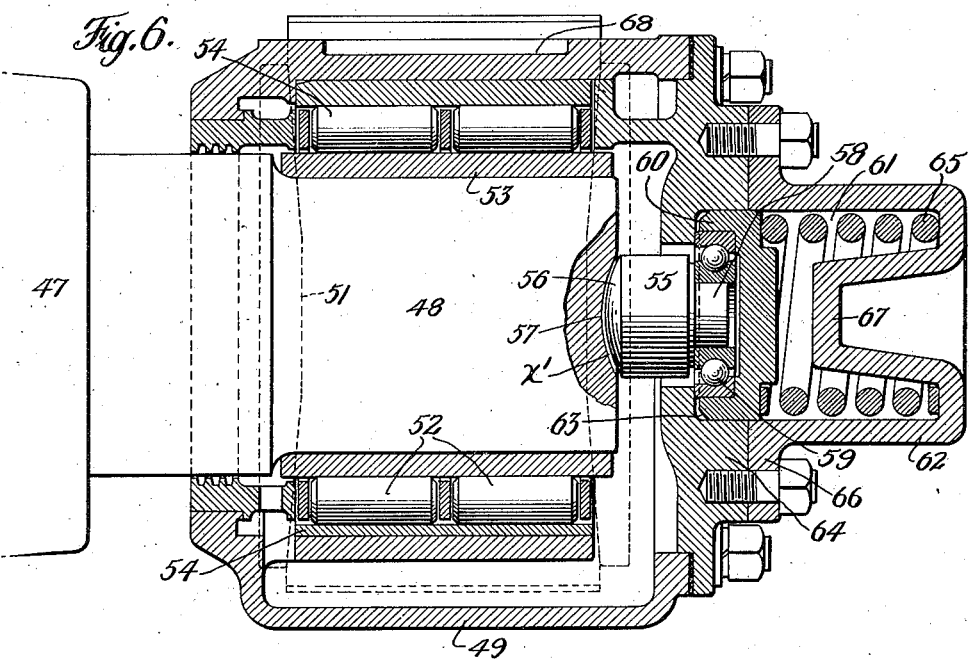
Figure 6 is a vertical central section taken longitudinally of an axle having an outside bearing box such as the axle of a trailer truck or a car truck and illustrating certain modifications of the invention suitable for this type of box.

Inspection of Figures 1 to 5 of the drawings will show that I have illustrated a locomotive driving axle 6 with its driving wheels 7. Near each end, the axle 6 is provided with an annular shoulder 8, between which shoulders and the adjacent wheels are mounted the bearing structures to be described below. Each end of the axle passes through an axle box 9 (in this instance a driving box) which receives the load of the vehicle through a saddle structure 10 arranged to straddle the frame members 11 in a manner familiar to those skilled in the art.

The box 9 is of inverted U-construction, the sides of which are provided with the flanges 12 which are adapted to embrace the pedestal jaws 13. The open lower end of the box is closed by means of the cellar member 14 which is held in place by means of the wedges 15 which react between opposed shoulders 16 and 17, the first of which are located on the cellar member 14 and the second of which on the sides 18 of the box 9 (see particularly Figure 3). The cellar member is provided with lug members 19 which are adapted to embrace the side members 18. U-shaped wear plates 20 are interposed between the pedestal jaws 13 and the box and its flanges, as shown probably to best advantage in Figure 4. The customary pedestal binder 21 is secured in position across the pedestal jaws 13, as shown in Figure 3.

In connection with my invention, it is necessary that the axle box be mounted in the pedestal jaws so as to have freedom for vertical and transverse rocking movements in the frame, although at the same time the box must be restrained as against bodily movement transverse of the frame. To this end, I prefer to form the flanges 12 of the box in such a way as to provide high points 22 approximately at their mid points, as shown probably to best advantage in Figure 1 at the right-hand side, which high points fit the adjacent liner 20 with sufficient closeness to substantially prevent bodily transverse movement of the box. From this high point, the flanges taper or curve upwardly and downwardly away from the liner, approximately as indicated at 23. This, of course, will permit the box to rock as the axle rocks under the influence of the motion of the vehicle. The box flanges, therefore, are, as it were, curved or tapered from the mid point upwardly and downwardly away from the pedestal jaws 13 and, as stated, I prefer this arrangement although it is obvious that the same end could be accomplished by making the flanges straight and curving the adjacent faces of the pedestals 13 or the liner 20.

The anti-friction bearing which I have employed in the structure illustrated in Figures 1 to 4 inclusive is of the well-known straight roller type involving the use of an inner race 24 and an outer race 25, between which races are located an annular series of straight rollers 26. Only one ring of rollers 26 is illustrated in the present embodiment, although it will be understood that a plurality of spaced rings of rollers might equally well be employed.

The outer race 25 is seated in a suitable recess in the box 9 and in the cellar 14, while the inner race 24 is fixed to the axle 6 in such a way as to move therewith during lateral motion. At the outside of each roller bearing is a suitable ring or washer 27, and at the inside a specially constructed thrust member 28, the function of which will appear more fully hereinbelow. The parts just described are held in their proper positions by means of the spaced collars or sleeves 29 and 30, against the periphery of which are arranged suitable oil retaining rings 31.

The arrangement of the roller bearing is such as to cause the rollers 26 to move laterally with the inner race 24 upon lateral motion of the axle 6. The rollers 26, therefore, slide laterally with respect to their outer races, which has particular advantages in securing the necessary lateral motion, for the reason that the friction between the parts is reduced to a minimum by an arrangement of this kind, it being relatively easy to move the axle with respect to the box where such motion can take place between one of the races on the one hand and the rollers on the other hand.

In order to take care of the thrust incident to the lateral motion, as well as to provide means for yieldingly resisting and controlling the lateral motion, the member 28 is flared outwardly into an annular recess or pocket 32, as shown in the left-hand portion of Figure 1. Opposed to the outwardly flared portion of this member 28 are a series of spring-held plungers 33, mounted in housings 34, having screw-threaded caps 35, the springs 36 being arranged to react between the caps 35 and the annular shoulders 37 on the plungers 33. The inner ends 38 of the plungers project through suitable openings in the side wall of the annular chamber 32, and between these ends 38 and the outwardly flared portion of the member 28 is located a suitable anti-friction thrust bearing 39 of a self contained type which, in this instance, is illustrated as an ordinary ball bearing, although any other suitable type of thrust bearing can, of course, be employed.

The parts are shown in their neutral or mid position in Figure 1, upon inspection of which it will be seen that in this position there is a small amount of clearance marked X between the inner ends of the plungers 38 and the faces of the containing ring 39a of the thrust bearing. This clearance permits a certain amount of free motion of the axle which is referred to by those skilled in the art as "free lateral". The controlled lateral motion comes into play after the "free lateral" has been taken up. The relative degrees of "free lateral" and "controlled lateral" can, of course, be arranged as desired to suit individual conditions. The extent of the "controlled lateral" may be determined either by the moment when the thrust bearing comes in contact with the wall through which the plungers 33—38 project or by some limitation which may be placed upon the amount of movement of which such plungers are capable. Figure 2 illustrates the parts in their extreme position of lateral motion.

The operation of the device, of course, is obvious from the description, but it might be said that by the arrangement illustrated I am enabled to impose whatever degree of resistance to lateral motion may be suitable or desirable for any given axle. Furthermore, the number of spring housings 34 may be varied to suit individual conditions and they may be spaced circumferentially in any manner which is most convenient or expeditious. In the present instance I have shown six of these housings 34 three of which are on the main portion 9 of the axle box and the other three on the cellar portion 14. The thrust bearing 39 of course is laterally movable with the axle 6 the inner race 24 of the roller bearing and the rollers 26. The box and the outer race 25 remain substantially stationary in the pedestal jaws 13 as already described.

In the modification illustrated in Figure 5 I have illustrated the use of a different type of roller bearing i. e., a bearing in which are employed oppositely disposed rings of tapered rollers 40. In an arrangement of this kind, the outer race 41, as well as the inner race 42, is adapted to move with the axle 6. The outer race 41, however, is provided with a backing member 43 having flanges 44 which fit down around the sides of the outer race, wear plates 45 being interposed between the flanges 44 and the sides of the outer race 41. The bearing, as a whole, moves with the axle 6, and the backing member 43 slides against the wear piece 46 in the upper portion of the box 9. The spring-held plungers 33 operate in the same manner as the plungers in the other figures, except that their inner ends 38 abut against the backing member 43. In an arrangement of this kind, an independent thrust bearing between the plungers and the roller bearing is not necessary, for the reason that the type of roller bearing illustrated takes both radial and thrust loads. The box flanges, however, are tapered in the same way in which these flanges are tapered in the other construction illustrated in Figures 1 to 4, there being a high point 22 substantially midway of the flanges, from which high point they flare outwardly both above and below, as indicated at 23. In order to reduce friction as much as possible between the backing member 43 and the wear plate 46, the wear plate may be made of a material in which a suitable lubricant may be embedded, or other lubrication may be provided, as seems most desirable.

Figure 7:
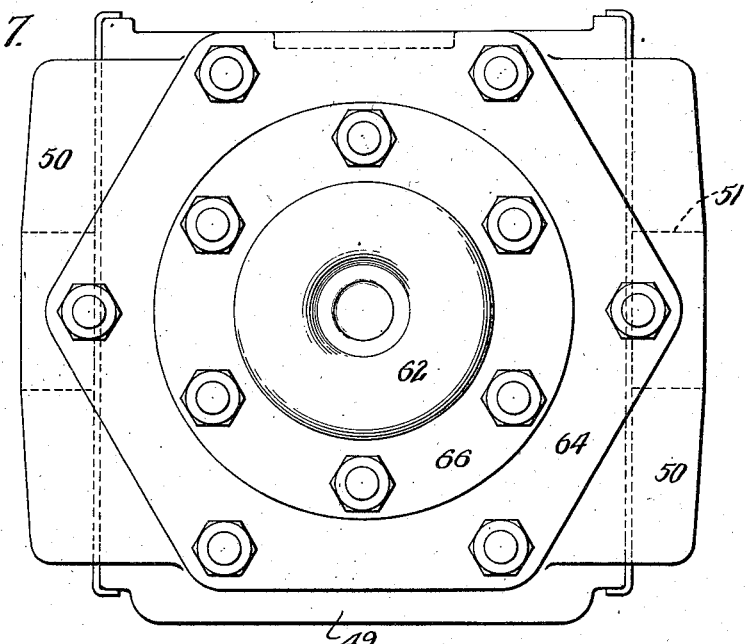
Figure 7 is a side elevation of the structure shown in Figure 6.

The modification illustrated in Figures 6 and 7 is particularly adapted for use in connection with axles where the bearing or axle boxes are located to the outside of the wheels instead of to the inside as is the case with the driving axles already described and shown in Figures 1 to 5 inclusive. The principles involved, however, are essentially the same, although the structure is necessarily changed. Here the hub of the wheel is shown at 47 and the axle journal at 48, the latter being mounted in the axle box 49 which is provided with the flanges 50 for embracing the pedestal in which the axle is mounted. As in the case of the other figures, each flange 50 is provided with a central high point 51 which contacts with the adjacent face of the pedestal, the flange tapering away from this high point above and below the center of the axle so that the box is free to rock as the axle rocks during service. The box, however, is restrained as against lateral motion by the high points 51.

The axle is journaled in a roller bearing having two annular series of straight rollers 52, the inner race 53 of which is fixed to the journal 48 and moves therewith while the outer race 54 (of eccentric construction) is fixed in the box 49, the arrangement being such that the inner race 53 will slide across the rollers 52 during lateral movements of the axle.

Controlled lateral motion is provided for by the large diameter thrust pin 55 arranged in opposing relation to the end of the axle, the inner end 56 of the pin 55 being spherical as shown and adapted to seat in a correspondingly shaped recess 57 in the end of the axle. In the neutral position shown in Figure 6 there is a slight clearance X' shown between the two faces 56 and 57 which, of course, is for the purpose of permitting a certain degree of "free lateral" before the "controlled lateral" comes into play.

The outer end 58 is reduced and is fitted into the ball bearing 59 which in turn is mounted in the cupped retaining plate 60. This bearing is arranged to take both thrust and radial loads as shown and the cup-shaped plate 60 is adapted to reciprocate in the chamber 61 formed by the cap member 62 in cooperation with a recess 63 in the end wall 64 of the box. A spring 65 is interposed between the outer face of the cup-shaped plate 60 and the base of the recess in the cap 62. The cap 62 is provided with flanges 66 by means of which it is bolted to the wall 64 as shown. The central portion of the cap is inwardly extended to form an abutment 67 against which the plate 60 is adapted to take in order to limit the lateral motion of the axle. The load, of course, is transmitted to the box by any suitable structure which rests thereupon in the pocket 68.

The operation of this modification is essentially the same as that of the structure illustrated in Figures 1 to 5 and it will be seen that in both arrangements the means for providing "controlled lateral" serves to cushion the movements of the axle whenever forces are brought into play which demand such lateral motion. Furthermore, the springs are designed to return the axles to normal or neutral position when such forces are no longer active.

I claim:

1. A lateral motion device for a railway vehicle axle including in combination with the frame of the vehicle, an axle box having flanges for embracing the frame so as to permit the box to have vertical movement but adapted to restrain the box as against transverse or lateral movement with respect to the frame, said flanges, however, being of contour such as to permit rocking movement of the box upon a longitudinal horizontal axis, an anti-friction bearing having an inner race which moves laterally with the axle within the box and an outer race which is fixed in the box, an annular, self-contained laterally movable anti-friction bearing surrounding the axle and adapted to receive the thrust of said movable race, and means for yieldingly resisting the movement of said laterally movable thrust bearing.

2. A lateral motion device for a railway vehicle axle including in combination with the frame of the vehicle, an axle box mounted in the frame so as to have freedom for vertical and transverse rocking movements in the frame but restrained as against bodily movement transverse of the frame, a roller bearing mounted in the box so that relative lateral movement between the rollers and one of their races may take place in a direction transverse of the frame, lateral movement of the axle causing such relative movement, an annular, self-contained laterally movable anti-friction thrust bearing surrounding the axle and adapted to receive the lateral thrust of the movable element of the roller bearing, and means carried by the box for yieldingly resisting movement of such laterally movable bearing.

3. A lateral motion device for a railway vehicle axle including in combination with the frame of the vehicle, an axle box mounted in the frame so as to have freedom for vertical and transverse rocking movements in the frame but restrained as against bodily movement transverse of the frame, a roller bearing having straight rollers mounted to move within the box with the axle in sliding relationship to the outer race of the bearing, an annular, self-contained laterally movable anti-friction thrust bearing surrounding the axle and adapted to receive the thrust of the rollers, and means carried by the box for yieldingly resisting the lateral movement of said thrust receiving bearing.

4. A lateral motion device for a railway vehicle axle including in combination with pedestal members of the vehicle frame, an axle box having flange members for embracing said pedestal members in opposed relationship so as to permit the box to have vertical movement but adapted to restrain the box as against transverse or lateral movement with respect to the frame, certain of said opposed members being of contour such as to permit vertical rocking movements of the axle, an anti-friction bearing having an inner race which moves laterally with the axle within the box and an outer race which is fixed in the box, an annular, self-contained laterally movable anti-friction thrust bearing surrounding the axle and adapted to receive the thrust of said movable race, and means for yieldingly resisting the movement of said laterally movable bearing.

5. A lateral motion device for a railway vehicle axle including in combination with pedestal members of the vehicle frame, an axle box having flange members for embracing said pedestal members in opposed relationship so as to permit the box to have vertical movement but adapted to restrain the box as against transverse or lateral movement with respect to the frame, certain of said opposed members being of contour such as to permit vertical rocking movements of the axle, anti-friction bearing means for the axle mounted to move within the box with the axle during movement of the axle laterally of the frame, an annular, self-contained laterally movable anti-friction thrust bearing surrounding the axle and adapted to receive the lateral thrust of said movable axle bearing means, and means for yieldingly resisting the movement of said thrust bearing.

6. A lateral motion device for a railway vehicle axle including in combination with the frame of the vehicle, an axle box having flanges for embracing the frame so as to permit the box to have vertical movement but adapted to restrain the box as against transverse or lateral movement with respect to the frame, said flanges, however, being of contour such as to permit rocking movement of the box upon a longitudinal horizontal axis, an anti-friction bearing having an inner race which moves laterally with the axle within the box and an outer race which is fixed in the box, an annular, self-contained laterally movable anti-friction thrust bearing adapted to receive the thrust of said axle, and means for yieldingly resisting the movement of said laterally movable bearing.

7. A lateral motion device for a railway vehicle axle including in combination with pedestal members of the vehicle frame, an axle box having flange members for embracing said pedestal members in opposed relationship so as to permit the box to have vertical movement but adapted to restrain the box as against transverse or lateral movement with respect to the frame, certain of said opposed members being of contour such as to permit vertical rocking movements of the axle, an anti-friction bearing having an inner and an outer race and an annular series of straight rollers therebetween, the inner race and the rollers being mounted so as to move laterally with the axle within the outer race, an annular, laterally movable thrust bearing surrounding the axle, means for transmitting the thrust of said inner race and the rollers to said thrust bearing, and means around the axle and carried by the box for yieldingly resisting the movement of said thrust bearing.

8. A lateral motion device for a railway vehicle axle including in combination with pedestal members of the vehicle frame, an axle box having flange members for embracing said pedestal members in opposed relationship so as to permit the box to have vertical movement but adapted to restrain the box as against transverse or lateral movement with respect to the frame, certain of said opposed members being of contour such as to permit vertical rocking movements of the axle, an anti-friction bearing having an inner and an outer race and an annular series of straight rollers therebetween, the inner race and the rollers being mounted so as to move laterally with the axle within the outer race, a self-contained laterally movable annular anti-friction bearing for receiving the thrust of said movable inner race, means for transmitting the thrust to said annular thrust bearing, and means carried by the box for yieldingly resisting the movement of said laterally movable thrust bearing.

9. A lateral motion device for a locomotive driving axle comprising in combination with the locomotive frame, a driving box inside the wheel of the axle having flanges for embracing the frame so as to permit the box to have vertical movement but adapted to restrain the box as against transverse or lateral movement with respect to the frame, said flanges, however, being of contour such as to permit rocking movement of the box upon a longitudinal horizontal axis, an anti-friction bearing having an inner race which moves laterally with the axle within the box, an annular self-contained anti-friction bearing surrounding the axle to the inside of said movable inner race, said self-contained bearing being laterally movable, means for transmitting the thrust of said movable inner race to said self-contained bearing, and a series of spring held plungers carried by the box and surrounding the axle and adapted to yieldingly resist movement of said self-contained bearing.

10. A lateral motion device for a railway vehicle axle including in combination with the frame of the vehicle, an axle box having flanges for embracing the frame so as to permit the box to have vertical movement but adapted to restrain the box as against transverse or lateral movement with respect to the frame, said flanges, however, being of contour such as to permit rocking movement of the box upon a longitudinal horizontal axis, an anti-friction bearing having an inner race which moves laterally with the axle within the box and an outer race which is fixed in the box, an annular self-contained anti-friction thrust bearing carried by the box opposite the end of the axle, said self-contained bearing being laterally movable, a thrust transmitting member fitting into said self-contained bearing, and means for yieldingly resisting lateral movement of said self-contained bearing.

11. A lateral motion device for a railway vehicle axle including in combination with pedestal members of the vehicle frame, an axle box having flange members for embracing said pedestal members in opposed relationship so as to permit the box to have vertical movement but adapted to restrain the box as against transverse or lateral movement with respect to the frame, certain of said opposed members being of contour such as to permit vertical rocking movements of the axle, an anti-friction axle bearing in said box having an annular series of straight rollers, the axle being mounted in said bearing to move laterally within the box, an annular, laterally movable thrust bearing surrounding the axle, means for transmitting the thrust of the axle to said thrust bearing, and means carried by the box for yieldingly resisting the movement of said thrust bearing.

12. A lateral motion device for a locomotive driving axle comprising in combination with the pedestal members of the locomotive frame, a driving box inside the wheel of the axle having flange members for embracing said pedestal members in opposed relationship so as to permit the box to have vertical movement but adapted to restrain the box as against transverse or lateral movement with respect to the frame, certain of said opposed members being of contour such as to permit vertical rocking movements of the axle, an anti-friction bearing having a series of straight rollers mounted so as to move laterally with the axle within the box, an annular thrust bearing surrounding the axle to the inside of said series of straight rollers, said annular thrust bearing being laterally movable, means for transmitting the thrust of said series of straight rollers to said annular thrust bearing, and yielding means carried by the box around the axle and adapted to resist movement of said annular thrust bearing.

13. A lateral motion device for a locomotive driving axle comprising in combination with the pedestal members of the locomotive frame, a driving box inside the wheel of the axle having flange members for embracing said pedestal members in opposed relationship so as to permit the box to have vertical movement but adapted to restrain the box as against transverse or lateral movement with respect to the frame, certain of said opposed members being of contour such as to permit vertical rocking movements of the axle, an anti-friction bearing having an inner and an outer race and a series of straight rollers therebetween, said inner race being mounted to move laterally with the axle within the box, an annular thrust bearing surrounding the axle to the inside of said inner race, said annular thrust bearing being laterally movable, means for transmitting the thrust of said inner race to said thrust bearing, and yielding means carried by the box around the axle and adapted to resist movement of said inner race.

GEORGE H. ZOUCK.